Nov. 26, 1963 I. UENO 3,112,358

FACSIMILE SYSTEM

Filed Feb. 17, 1960

INVENTOR

ISABURO UENO

BY Eugene Geoffrey Jr

ATTORNEY 3,112,358
Patented Nov. 26, 1963

3,112,358

FACSIMILE SYSTEM

Isaburo Ueno, Tokyo, Japan, assignor to Anritsu Dempa Kogyo Kabushiki Kaisha, Tokyo, Japan, a company of Japan Filed Feb. 17, 1960, Ser. No. 9,384
12 Claims. (Cl. 178—5)

This invention relates to improvements in facsimile transmission and receiving systems and more specifically to an improved facsimile system utilizing wire or radio or other communicating means that affords accurate scanning of the original writing, lettering or the like, and produces signal pulses which can be translated into faithful reproduction at the distant point of reception by similar or other suitable means.

Facsimile transducing devices for changing images into electric signals and vice versa hitherto employed have fallen generally into two categories, namely optical and electromechanical. In optical devices a disadvantage has been the complexity of the necessary apparatus. In electromechanical devices common difficulties have been variation in contact pressures due to small irregularities in the copy surface engaged by the relatively sharp stylus, abrasion of the copy surface, and accumulation of detrimental insulating or conducting particles on and about the point of the stylus.

Accordingly one object of the present invention resides in the provision of an improved facsimile transducer wherein uniform contact pressure is maintained by magnetic means.

A further object resides in the provision of a facsimile system apparatus employing rolling contact between the scanning means and the copy or image receiving sheet.

A further object resides in the provision of facsimile apparatus employing a plurality of scanning contact members applied to the copy or image receiving sheet in substantially continuous succession.

A further object resides in the provision of facsimile apparatus in which the copy to be transmitted is drawn or imprinted with an electrically conducting medium applied to a porous surface layer of insulating material underlaid by a conducting layer, and in which the locally applied conducting material is adapted to establish an electrical signaling circuit including the scanning contact member and the underlying conducting layer.

A further object resides in the provision of an improved copy sheet for use in the foregoing method and apparatus.

A still further object resides in the provision of improved facsimile method and characterized by its simplicity, efficiency, reliability, and relatively low cost.

Other objects and advantages of the invention will become more apparent from the following description when taken in connection with the accompanying drawings, in which.

Figures 1, 2, 3, 4, 5, 6, 7:
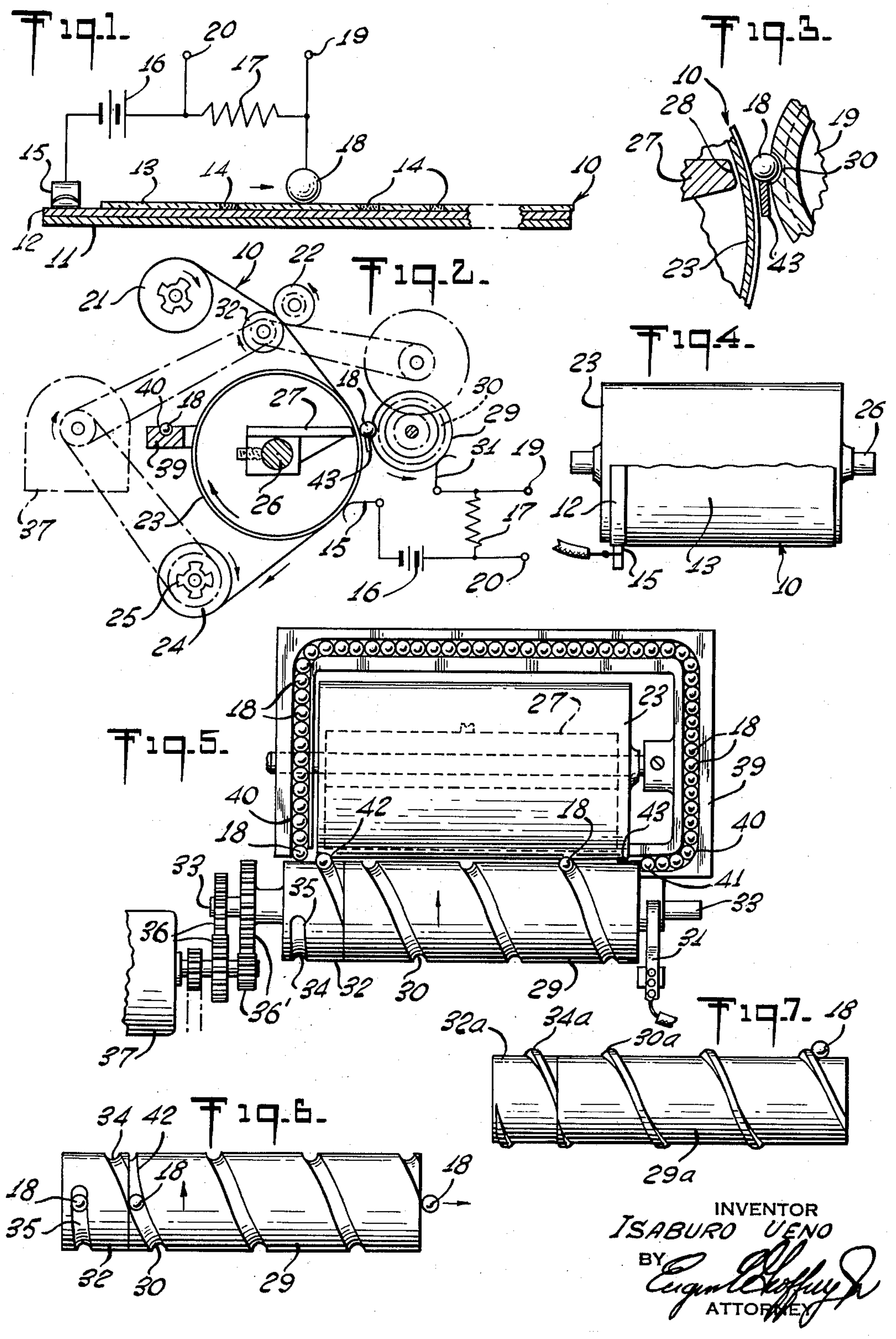
FIGURE 1 is a diagrammatic illustration of the scanning elements and circuit.
FIGURE 2 is a schematic side view of apparatus in accordance with the invention showing the operational relation between certain mechanical and electrical elements.
FIGURE 3 is an enlarged fragmental cross sectional view of the scanning elements of the embodiment of FIGURE 2.

FIGURE 4 illlustrates one embodiment of the invention for maintaining continuous electrical contact with the conductive layer of the copy sheet;

FIGURE 5 is a plan view of the embodiment of the invention shown in FIGURE 2;

FIGURE 6 is a detail illustration showing the relation between the cross-feeding cylinders and the scanning elements, and FIGURE 7 shows an alternative form of the cross-feeding cylinders.

Referring to FIGURE 1, the numeral 10 generally denotes a composite copy sheet including a backing layer 11, an intermediate layer 12, and a face layer 13, the thickness of all layers being necessarily exaggerated for clarity in explanation. The backing layer 11 is preferably of paper adapted to provide strength for the sheet. The intermediate layer 12 is of conducting material such as finely divided metal or carbon powder deposited on the backing layer 11, or if desired, of thin metallic foil. The face layer 13 is of porous insulating material, typically a deposit of powdered plastic on the conducting layer 12 so as to form a porous film thereon.

The numerals 14 denote local zones of the sheet on which lines or areas of the copy have been applied by means of a suitable conducting ink, lead pencil or by a pencil having a conductive liquid content adapted to flow into the pores of the insulating layer 13. Thus as a message, image or the like is originally impressed on the sheet 10, lines or areas of conductivity are established throughout the insulating layer 13, the extent, electrical conductivity and conversely the variation in resistance being governed by the extent, quantity and pressure of the original application. In other words, the extent and conductivity of the zones 14 are governed by the number of pores in the otherwise insulating layer 13 which are penetrated by the conducting medium and the concentration of the medium in the pores.

In order to translate the impressed original into corresponding electrical signals, a circuit is employed which includes in series a direct brush contact 15 with the intermediate conducting layer 12, a fixed potential source of current such as a battery 16, resistor 17, a spherical conductive scanning member 18 which is rolled across the sheet 10, and the zones of conductivity 14 as they are traversed by the member 18. As the member 18 moves across the sheet 10, unmarked portions of the layer 13 prevent passage of current, while as the zones 14 are encountered a current is established which varies in value in accordance with the series resistance existing in and throughout these copy zones 14. The result is a corresponding change in voltage across the resistor 17. Output terminals 19 and 20, connected to the resistor 17, provide means for applying the developed signals to a transmission system.

Referring now to FIGURE 2, the copy sheet or web 10 is initially wound on a supply reel 21 with the copy-bearing layer 13 outward, the sheet or web having sufficient unmarked leading length to allow for initial threading through the machine. From the reel 21 the web passes between two driving rollers 22, thence around a portion of the peripheral wall of the hollow drum 23 to a take-up reel 24, the latter being driven through a suitable friction clutch 25. The drum 23 revolves on a stationary shaft 26. Secured to the stationary shaft within the drum is a bar magnet 27, preferably a permanent magnet, which extends throughout substantially the full interior length of the drum and has a narrow pole face 28 spaced closely adjacent the drum's peripheral shell of nonmagnetic material, as shown in enlarged detail in FIGURE 3. Thus it will be evident that the effect of the magnet 27 is to produce a narrow zone or strip of magnetic field extending throughout substantially the length of the drum 23 and adapted to exert a strong attraction on any exterior magnetic object falling within its influence, as for instance the balls 18 of magnetic material.

The numeral 29 denotes a cross-feeding cylinder of electrically conducting but non-magnetic material such as brass. This cylinder, which is shown in detail in FIGURES 5 and 6, has a shallow helical groove 30 adapted to receive the scanning balls 18.

In operation, the copy sheet 10 is moved at the desired speed set by the rollers 22 and is maintained taut on the periphery of the backing or support drum 23 by the action of the take-up reel 24. The cross-feed cylinder is also driven at a predetermined peripheral speed coordinated with the speed of the sheet or web 10. A scanning ball 18 is deposited in the leading end of the helical groove 30 in line with the field zone of the magnet 27 by means hereinafter explained in connection with FIGURES 5 and 6. Magnetic attraction draws the ball 18 firmly against the outer surface of the sheet 10 and at the same time resists any tendency of the ball to move circumferentially out of the line of attraction. The helical groove 30 therefore rolls the ball along the line of magnetic attraction, causing the ball to scan the copy as shown in FIGURE 1. During this traverse, the magnet maintains firm and even pressure of the rolling ball on the sheet 10, ensuring uniform contact with the copy lines or areas 14, as shown in FIGURE 1, and produces correspondingly accurate output signals.

The driving pressure of the conducting cylinder 29 in moving the balls 18 transversely of the sheet 10 maintains uniform electrical contact between these members, and one side of the signal circuit is electrically connected to the cylinder 29 by means of the brush 31 bearing on the cylinder. To provide for proper contact with the intermediate conducting layer 12 of the copy sheet 10, the insulating layer 13 may be omitted from a narrow zone along one edge of the sheet, as shown in FIGURES 1 and 4, and a brush 15 placed in engagement with the exposed conducting layer in this zone.

As each scanning ball 18 completes its traverse as described, it is ejected from the helical groove 30 and a second ball is fed into the groove to follow the same scanning path, but engaging the copy sheet in a path displaced from that of the preceding ball by a distance governed by the chosen speed at which the sheet is being fed in relation to the speed of traverse. In the same manner, a third ball follows the second, a fourth follows the third, etc., in timed relation providing substantially continuous scanning. The manner in which this successive feed of the scanning members is accomplished is best explained with reference to FIGURES 5 and 6.

In FIGURE 5 it will be noted that, in addition to the main cross-feed cylinder 29, the apparatus includes a short cylinder 32 of similar diameter abutting or closely adjacent the left or in-feed end of the main cylinder. Both cylinders are mounted on a common shaft 33, the main cylinder 29 being secured to the shaft while the short cylinder 32 is rotatably mounted thereon. The short cylinder has a peripheral groove 34 which is formed with a brief circumferential portion 35 leading into a helix, this groove in the present example describing a single turn about the cylinder. Similarly in the present case, the groove 30 in the cylinder 29 encompasses three turns.

The shaft 33 and the attached main cross-feed cylinder 29 are driven through gears 36 by a suitable gearmotor 37 of the synchronous type. The short cylinder 32, hereinafter referred to as the delay cylinder, is also driven by the motor 37 via gearing 36′, but at a rotational speed one-third that of the main cylinder. Thus the rotational speeds of the two cylinders are in direct proportion to the numbers of turns of their respective grooves.

A frame 39 has therein a channel 40 providing a return path for the scanning balls 18. The lefthand or input end of the channel 40 is directed radially toward the short or delay cylinder 32 in line with the leading portion 35 of the groove 34, while the exit end 41 leads longitudinally away from the opposite end of the main cylinder 29, the level of both inlet and exit being aligned with the longitudinal field zone of the magnet 27. The length of the channel 40 is so proportioned to the diameter of the balls 18 that when the channel is filled as shown, entry of an additional ball at the right end 41 forces ejection of a ball from the left end of the channel.

The relative rotational positions of the cylinders 29 and 32 are set, as shown in FIGURE 6, so that at the time that the terminal end of the scanning groove 30 discharges a ball 18 into the chanel 40 the lead portion 35 of the delay groove 34 is in line with the other end of the channel to receive the ball ejected therefrom, while at the same time the terminal end of the delay groove 34 registers with the entering end of the groove 30 to deliver a ball 18 thereto. To allow for the relatively slow rotation of the delay cylinder 32, the forward wall of the main groove 30 is cut back at 42, thus preventing jamming at the transfer point. The message-bearing width of the sheet 10 being that portion aligned with the main cross-feed cylinder 29, it will be evident that the synchronized cooperation of the two cylinders provides substantially continuous scanning, no interval for resetting of a single scanning member being required. The successive use of a plurality of rolling contact members instead of a single stylus prevents fouling and abrasion, and in combination with the magnetically maintained even contact pressure, assures the accurate signal generation previously mentioned.

The grooved outer portion of the delay cylinder 32 (so termed because it automatically delays feed of a contact ball to the scanning zone until the previously fed ball has completed its operation) is made of a suitable insulating material such as nylon, so that the ball 18 in the groove 34 is not included in the signal circuit and thus cannot cause a false signal as it traverses the exposed edge strip of the intermediate conducting layer 12 shown in FIGURES 1 and 3. A small inwardly extending tongue 42 at the entry end of the channel 40 and underlying each ball 18 as shown in FIGURES 5 and 3, serves to guide the ball until the latter enters the zone of magnetic attraction, a similar tongue 43 being provided at the discharge station to guide the balls as they are propelled out of the magnetic zone. Obviously these two tongues may, if desired, be extended and joined as a continuous transverse rib to assist the magnetic field in maintaining accuracy of the scanning line.

An alternative construction is shown in FIGURE 7. Since the transverse feeding thrust against the scanning balls 18 is always in the same direction, the delay cylinder 32–*a* and main cross-feed cylinder 29*a* may be constructed with respective helical ribs 34–*a* and 30–*a* instead of grooves. With this type of structure the operation is essentially the same as that previously described. As a further alternative, the open return channel 40 may be replaced by a tube of suitable diameter.

The invention as described thus far relates to its use in the conversion of an image into electrical pulses for purposes of transmission. It will be observed, however, that the improved scanning structure may be utilized for the conversion of electrical pulses into an image at the receiving station. In this case the image sheet in the form of an electric current responsive papers would be used in place of the conductive image sheet 10 previously described and the received signals would be applied to the current responsive paper through contact 15 and to the roller 29 (29–*a*) and balls 18 by means of contact 31. In this way an image will be formed on the current responsive paper that will correspond with the image used to produce the received signals. Current responsive papers are well known in the art and are arranged in one form to change color when an electric current is passed through it. It is to be understood, of course, that suitable timing pulses must be employed to synchronize the transducers at both the transmitting and receiving stations.

While only certain embodiments of the invention have been illustrated and described, it is evident the changes, alterations, and modifications may be made without departing from the true scope and spirit thereof as defined in the appended claims.

What is claimed is:

1. In a facsimile transmission system, in combination, a hollow rotary drum having a cylindrical shell of thin, non-magnetic material, a stationary magnet within said drum and having a pole face closely adjacent a narrow interior arc of said shell throughout a substantial longitudinal extent thereof, whereby a narrow zone of magnetic attraction is established through and outside said shell, a sheet carrying copy to be scanned, means to move said sheet through said magnetic zone in guided engagement with said drum, a scanning member of magnetic material bearing against the sheet with a pressure determined by said magnet, and mechanical means to propel said scanning member lineally across said sheet within said magnetic zone.

2. In a facsimile transmission system, in combination, a hollow rotary guide drum, a rotary cross-feed cylinder of conductive material disposed parallel to said drum and narrowly spaced therefrom, said cylinder having a helical peripheral groove, a stationary magnet within said drum establishing a narrow linear zone of magnetic attraction along said space between said drum and said cylinder, a copy sheet having localized zones of conductivity delineating the copy to be transmitted, means to move said sheet through said narrow zone in guided engagement with said drum and at predetermined speed, a plurality of scanning balls of conductive magnetic material, means to rotate said cross-feed cylinder at predetermined speed, means for inserting said balls singly in timed interval relation in the leading end of said helical groove in said magnetic zone whereby said balls may be successively propelled across said sheet in magnetically determined pressure contact with said sheet, and circuit means establishing an electric current path through said cylinder, said balls and said localized conductive zones of said copy sheet.

3. In a facsimile transmission system according to claim 2 wherein said ball-inserting means establishes said timed interval and synchronizes the insertion of each ball in said groove with the exit of the preceding ball from said groove.

4. In a facsimile transmission system according to claim 2 including means forming a return channel for said balls from the exit end of said helical groove to said inserting and timing means.

5. In a facsimile transmission system according to claim 2 wherein said ball inserting and timing means includes a second rotary cylinder concentric with said first cylinder and of similar diameter, said second cylinder having a helical peripheral groove of fewer turns than said first cylinder, means to drive said second cylinder at a speed less than that of said first cylinder in proportion to said respective numbers of turns, and said system further includes means forming a return channel for said balls from the exit end of said first helical groove to the entry end of said second helical groove.

6. In an electric scanning device for a facsimile transmission system, in combination, means to support a copy sheet, means to move said sheet longitudinally thereof on said supporting means, means associated with said supporting means to establish a narrow zone of magnetic attraction across said sheet and through the same, a plurality of scanning electrode members of magnetic material, rotary helical cross-feeding means adapted to move said scanning members transversely along said zone in magnetically determined pressure contact with said copy sheet, and means to deliver said scanning members to said helical means in timed succession.

7. In an electric scanning device for a facsimile transmission system, in combination, means to support a copy sheet to be scanned, means to move said sheet longitudinally thereof on said supporting means, means associated with said supporting means to establish a narrow zone of magnetic attraction across said copy sheet and through the same, a plurality of spherical scanning electrodes of magnetic material, a helically grooved rotary cross-feeding member adapted to move said spherical electrodes transversely along said zone in magnetically determined pressure contact with said copy sheet, means to deliver said electrodes to said helically grooved feeding member in timed succession, and means forming a return path for said electrodes from said feeding member to said timed delivery means.

8. In an electric scanning device for a facsimile transmission system, in combination, means to support a copy sheet to be scanned, means to move said sheet longitudinally thereof on said supporting means, means associated with said supporting means to establish a narrow zone of magnetic attraction across said copy sheet and through the same, a plurality of spherical scanning electrodes of magnetic material, a helically ribbed rotary cross-feeding member adapted to move said spherical electrodes transversely along said zone in magnetically determined pressure contact wtih said copy sheet, means to deliver said electrodes to said helically ribbed feeding member in timed succession, and means forming a return path for said electrodes from said feeding member to said timed delivery means.

9. In a facsimile transmission system, in combination, a copy sheet having a surface layer including zones of altered electrical resistance defining copy images impressed thereon, means to move said sheet longitudinally, a plurality of conductive spherical scanning members, means to roll said members laterally across said sheet in timed scanning succession, magnetic means to press said rolling members against said surface layer, circuit means to establish series current signals through said rolling members and said zones of altered resistance, and means for detecting said signals.

10. In facsimile apparatus, a transducer comprising a hollow rotary drum having a cylindrical shell of thin, non-magnetic material, an elongated stationary magnet within said drum and having a relatively narrow pole face closely adjacent the interior surface of said shell and extending throughout a substantial longitudinal extent thereof, said magnet producing a magnetic field externally of said drum, means for carrying and moving an image sheet through said magnetic field in guided engagement with said drum, a scanning member of magnetic material and means to propel said scanning member linearly across said sheet within said magnetic field.

11. In a facsimile system a transducer comprising a hollow rotary guide drum, a rotary cross feed cylinder of conductive material disposed parallel to said drum and narrowly spaced therefrom, said cylinder having helical peripheral means, a stationary magnet within said drum establishing a narrow linear zone of magnetic attraction along the space between said drum and said cylinder, an image sheet, means for moving said sheet through said narrow zone in guided engagement with said drum at a predetermined speed, a plurality of scanning balls of conductive magnetic material, means to rotate said cross feed cylinder at a predetermined speed, means for inserting said balls singly in timed interval relation into engagement with the leading end of said helical peripheral means and in said magnetic zone whereby said balls are successively propelled across said sheet in magnetically determined pressure contact with said sheet and circuit means establishing an electric current path through said cylinder, said balls and said sheet.

12. In a facsimile system, a transducer according to claim 11 including means forming a return channel for said balls from the exit end of said helical means to said inserting and timing means.

References Cited in the file of this patent

UNITED STATES PATENTS

| | | |
|---|---|---|
| 2,226,589 | Smyers | Dec. 31, 1940 |
| 2,229,091 | Kline | Jan. 21, 1941 |
| 2,528,005 | Kline | Oct. 31, 1950 |
| 2,554,017 | Dalton | May 22, 1951 |
| 2,760,840 | Gordon | Aug. 28, 1956 |
| 2,830,114 | Carlson | Apr. 8, 1958 |
| 2,831,056 | Artzt | Apr. 15, 1958 |
| 2,887,353 | Barstrom | May 19, 1959 |
| 2,929,754 | Stark | Mar. 22, 1960 |
| 3,015,534 | Ueno | Jan. 2, 1962 |

FOREIGN PATENTS

| | | |
|---|---|---|
| 18,346 | Great Britain | Sept. 13, 1901 |

OTHER REFERENCES

Norris et al.: Abstract of application Serial No. 576,-866, published September 20, 1949, vol. 626, page 869, O.G. September 20, 1949.